US011267746B2

(12) United States Patent
Mori et al.

(10) Patent No.: US 11,267,746 B2
(45) Date of Patent: Mar. 8, 2022

(54) GLASS FILM PRODUCTION METHOD

(71) Applicant: Nippon Electric Glass Co., Ltd., Shiga (JP)

(72) Inventors: Hiroki Mori, Shiga (JP); Yohei Kirihata, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 309 days.

(21) Appl. No.: 16/486,279

(22) PCT Filed: Feb. 22, 2018

(86) PCT No.: PCT/JP2018/006394
§ 371 (c)(1),
(2) Date: Aug. 15, 2019

(87) PCT Pub. No.: WO2018/168380
PCT Pub. Date: Sep. 20, 2018

(65) Prior Publication Data
US 2020/0079679 A1    Mar. 12, 2020

(30) Foreign Application Priority Data
Mar. 13, 2017  (JP) .............................. JP2017-047145

(51) Int. Cl.
*C03B 35/16* (2006.01)
*C03B 17/06* (2006.01)
*C03B 33/09* (2006.01)

(52) U.S. Cl.
CPC ............ *C03B 35/16* (2013.01); *C03B 17/064* (2013.01); *C03B 33/091* (2013.01)

(58) Field of Classification Search
None
See application file for complete search history.

(56) References Cited

U.S. PATENT DOCUMENTS 3,944,461 A * 3/1976 Ogron ............... B32B 17/10935
156/538
6,502,423 B1 * 1/2003 Ostendarp ............... C03B 17/06
65/29.14
(Continued)

FOREIGN PATENT DOCUMENTS

JP    2012-526721    11/2012
JP    2012-240883    12/2012
(Continued)

OTHER PUBLICATIONS

International Preliminary Report on Patentability dated Sep. 17, 2019 in International (PCT) Application No. PCT/JP2018/006394.
(Continued)

*Primary Examiner* — Jodi C Franklin
(74) *Attorney, Agent, or Firm* — Wenderoth, Lind & Ponack, L.L.P.

(57) ABSTRACT

A method of manufacturing a glass includes a conveying step of moving a conveyance sheet material that contacts a lower surface of a glass film, to thereby convey the glass film. The conveyance sheet material includes a first contact portion that contacts the lower surface of the glass film on an upstream side in a manufacture-related process step, a second contact portion that contacts the lower surface of the glass film on a downstream side in the manufacture-related process step, and a non-contact portion that is prevented from contacting the lower surface of the glass film. In this method, the manufacture-related process step includes subjecting the glass film to a predetermined process at a position corresponding to the non-contact portion between the first and second contact portions while simultaneously moving the first, second, and non-contact portions of the conveyance sheet material through the conveying step.

11 Claims, 8 Drawing Sheets

(56) References Cited

U.S. PATENT DOCUMENTS

| | | | | |
|---|---|---|---|---|
| 8,312,741 | B2* | 11/2012 | Teranishi | C03B 33/0235 65/97 |
| 9,038,414 | B2* | 5/2015 | Fleming | B65H 20/14 65/29.18 |
| 9,428,359 | B2* | 8/2016 | Garner | B65H 18/103 |
| 9,458,047 | B2* | 10/2016 | Teranishi | C03B 33/02 |
| 9,932,259 | B2* | 4/2018 | Hasegawa | C03B 33/0235 |
| 10,800,696 | B2* | 10/2020 | Aburada | C03B 33/0235 |
| 10,829,404 | B2* | 11/2020 | Teranishi | C03B 33/023 |
| 10,870,601 | B2* | 12/2020 | Bayne | B65G 49/065 |
| 2011/0023548 | A1* | 2/2011 | Garner | B32B 37/142 65/106 |
| 2011/0192878 | A1* | 8/2011 | Teranishi | B65H 16/00 226/1 |
| 2012/0017642 | A1* | 1/2012 | Teranishi | C03B 35/246 65/105 |
| 2012/0047957 | A1* | 3/2012 | Dannoux | C03B 33/093 65/112 |
| 2012/0125967 | A1* | 5/2012 | Furuta | C03B 33/033 225/3 |
| 2012/0131962 | A1* | 5/2012 | Mitsugi | C03B 33/033 65/112 |
| 2012/0318024 | A1* | 12/2012 | Mori | B65H 23/195 65/90 |
| 2013/0126576 | A1* | 5/2013 | Marshall | C03B 33/03 225/2 |
| 2013/0129987 | A1* | 5/2013 | Mitsugi | B32B 7/06 428/189 |
| 2013/0196163 | A1* | 8/2013 | Swanson | B32B 17/06 428/426 |
| 2014/0299252 | A1* | 10/2014 | Abe | D04H 1/74 156/62.2 |
| 2014/0311409 | A1* | 10/2014 | Asuma | H01J 37/3277 118/718 |
| 2015/0076203 | A1* | 3/2015 | Mishina | C03B 33/033 225/96 |
| 2015/0251944 | A1* | 9/2015 | Brackley | B26D 7/32 83/23 |
| 2015/0315059 | A1* | 11/2015 | Abramov | C03B 23/0235 65/176 |
| 2016/0016746 | A1* | 1/2016 | Teranishi | B65H 18/00 242/532.1 |
| 2016/0075589 | A1* | 3/2016 | Shi | B65H 51/32 65/25.2 |
| 2016/0139314 | A1* | 5/2016 | Inomata | G02B 30/27 349/193 |
| 2016/0168003 | A1* | 6/2016 | Hasegawa | C03B 33/091 65/105 |
| 2016/0272456 | A1* | 9/2016 | Cho | C03B 33/0235 |
| 2017/0057860 | A1* | 3/2017 | Habeck | C03B 21/06 |
| 2018/0037487 | A1* | 2/2018 | Gerber | C03B 13/16 |
| 2018/0044216 | A1 | 2/2018 | Hasegawa et al. | |
| 2018/0141848 | A1* | 5/2018 | Aburada | C03B 33/0235 |
| 2019/0161385 | A1* | 5/2019 | Mitsugi | B23K 26/402 |
| 2019/0292086 | A1* | 9/2019 | Murashige | C03B 33/091 |
| 2019/0352115 | A1* | 11/2019 | Mori | B65H 23/188 |
| 2020/0339464 | A1* | 10/2020 | Tamamura | C03B 33/033 |
| 2020/0361807 | A1* | 11/2020 | Ikai | C03B 33/0235 |
| 2021/0130217 | A1* | 5/2021 | Mori | C03B 33/091 |
| 2021/0179474 | A1* | 6/2021 | Kurek | C03B 17/067 |

FOREIGN PATENT DOCUMENTS

| | | |
|---|---|---|
| WO | 2010/132637 | 11/2010 |
| WO | 2015/029888 | 3/2015 |

OTHER PUBLICATIONS

International Search Report dated May 15, 2018 in International (PCT) Application No. PCT/JP2018/006394.

* cited by examiner

GLASS FILM PRODUCTION METHOD

This application is a U.S. National Phase Application of International (PCT) Application No. PCT/JP2018/006394, filed on Feb. 22, 2018, which claims priority to Japanese Patent Application No. 2017-047145, filed on Mar. 13, 2017.

TECHNICAL FIELD

The present invention relates to a method of manufacturing a glass film capable of being taken up into a roll shape.

BACKGROUND ART

As is well known, thinning of glass sheets to be used in flat panel displays (FPD), such as a liquid crystal display and an OLED display, glass sheets to be used in OLED illumination, glass sheets to be used for manufacturing a tempered glass that is a component of a touch panel, and the like, and glass sheets to be used in panels of solar cells, and the like has been advancing.

For example, in Patent Literature 1, there is disclosed a glass film (thin sheet glass) having a thickness of several hundred micrometers or less. As described also in this literature, this kind of glass film is generally obtained through continuous forming with a forming device employing a so-called overflow down-draw method or a float method.

For example, an elongated glass film obtained by the continuous forming by the overflow down-draw method is changed in its conveying direction from a vertical direction to a horizontal direction, and is then continuously conveyed to a downstream side with a lateral conveying portion (horizontal conveying portion) of a conveying device. The lateral conveying portion is configured to convey the glass film through use of a belt conveyor as disclosed in Patent Literature 1 or through use of a conveyance sheet material as disclosed in Patent Literature 2. In the process of the conveyance, both end portions of the glass film in a width direction are cut and removed. After that, the glass film is taken up into a roll shape with a take-up roller. Thus, a glass roll is formed.

In Patent Literature 1 and Patent Literature 2, as a method of cutting both the end portions of the glass film in the width direction, laser cleaving is disclosed. The laser cleaving involves forming an initial crack on the glass film by crack forming means, such as a diamond cutter, and then irradiating the portion with a laser beam to heat the portion, followed by cooling the heated portion by cooling means to develop the initial crack through a thermal stress generated in the glass film, to thereby cut the glass film.

As another cutting method, in Patent Literature 3, there is disclosed a cutting technology for a glass film utilizing a so-called peeling phenomenon. The technology involves irradiating the glass film (glass sheet) with a laser beam to melt-cut part of the glass film while conveying the glass film, and moving the melt-cut portion away from a laser beam irradiation region to cool the portion.

In this case, when the melt-cut portion is cooled, a substantially thread-like peeled material is generated (for example, see FIG. 1A to FIG. 1C of Patent Literature 3). A phenomenon in which the thread-like peeled material is peeled off from an end portion of the glass film is generally called peeling. When the thread-like peeled material is generated, a uniform cut surface is formed on the glass film after peeling.

CITATION LIST

Patent Literature 1: JP 2012-240883 A
Patent Literature 2: WO 2015/029888 A1
Patent Literature 3: JP 2012-526721 A

SUMMARY OF INVENTION

Technical Problem

When the glass film is cut through use of peeling, it is required that the thread-like peeled material be suitably collected without being broken in a middle thereof. As described in FIG. 1A to FIG. 1C of Patent Literature 3, the thread-like peeled material drops downward from the glass film. Therefore, in particular, when the glass film is conveyed through use of the conveyance sheet material, it is desired that the conveyance sheet material be separated from a generation position of the thread-like peeled material so that the thread-like peeled material is prevented from being brought into contact with the conveyance sheet material. For this purpose, when the glass film is irradiated with a laser beam between a first conveyance sheet material arranged on an upstream side and a second conveyance sheet material arranged on a downstream side, because the conveyance sheet material is not present at a position under the glass film, the thread-like peeled material can be generated without being brought into contact with the conveyance sheet material and can be suitably collected.

However, in a case in which the first conveyance sheet material and the second conveyance sheet material, which are individually arranged, are driven by individual drivers, when synchronization therebetween is not accurately performed, unexpected tension acts on the glass film, and there is a risk in that the thread-like peeled material may be broken at a middle thereof. In this case, the cut surface of the glass film does not become uniform, which may result in degradation of quality.

As described above, in the related-art method of manufacturing a glass film, it is difficult to convey the glass film so as to suitably perform the cutting step. This is a problem common to a manufacture-related process, such as an inspection step of inspecting quality and the like of the glass film or any other step, as well as the cutting process.

The present invention has been made in view of the above-mentioned circumstances, and a technological object of the present invention is to convey a glass film so that a manufacture-related process can be suitably performed.

Solution to Problem

In order to solve the above-mentioned problems, according to one embodiment of the present invention, there is provided a method of manufacturing a glass film, comprising: a conveying step of conveying an elongated glass film from an upstream position to a downstream position in a conveying direction along a longitudinal direction thereof; and a manufacture-related process step of subjecting the glass film to a predetermined process, wherein the conveying step comprises moving a conveyance sheet material that is brought into contact with a lower surface of the glass film, to thereby convey the glass film, wherein the conveyance sheet material comprises: a first contact portion that is brought into contact with the lower surface of the glass film on the upstream side in the manufacture-related process step; a second contact portion that is brought into contact with the lower surface of the glass film on the downstream side in the manufacture-related process step; and a non-contact portion that is formed between the first contact portion and the second contract portion and is prevented from being brought into contact with the lower surface of the glass film, and wherein the manufacture-related process step comprises subjecting the glass film to the predetermined process at a position corresponding to the non-contact portion while simultaneously moving the first contact portion, the second contact portion, and the non-contact portion of the conveyance sheet material through the conveying step.

As described above, according to the method of the present invention, under a state in which the first contact portion of the conveyance sheet material is brought into contact with the lower surface of the glass film on the upstream side in the manufacture-related process step, and the second contact portion of the conveyance sheet material is brought into contact with the glass film on the downstream side in the manufacture-related process step, the first contact portion, the second contact portion, and the non-contact portion are simultaneously moved through the conveying step, to thereby convey the glass film. As described above, when the glass film is conveyed through use of the common (one) conveyance sheet material on the upstream side and the downstream side in the manufacturing-related process step, the conveyance of the glass film before and after the manufacture-related process step can be accurately synchronized. With this, unexpected tension is prevented from acting on the glass film, and positional displacement of the glass film during conveyance can also be prevented. As described above, when the glass film is conveyed in an accurate and proper posture, the manufacture-related process step in the middle of the conveyance can be suitably performed.

In the method of manufacturing a glass film, it is preferred that the conveying step comprise moving the second contact portion to the downstream side by a conveying device, to thereby simultaneously move the first contact portion and the non-contact portion. As described above, the second contact portion positioned on the downstream side is driven, and the first contact portion and the non-contact portion on the upstream side are pulled to the downstream side, and thus the first contact portion, the second contact portion, and the non-contact portion can be simultaneously moved.

Further, the non-contact portion is supported by a first guide roller arranged on the upstream side and a second guide roller arranged on the downstream side so that the non-contact portion is deformed downward into a recessed shape at a position below the first contact portion and the second contact portion, and a separation distance between the first guide roller and the second guide roller in the conveying direction is set to be larger than a separation distance between the first contact portion and the second contact portion.

When the non-contact portion is separated from the glass film and deformed downward into a recessed shape with the first guide roller and the second guide roller, a space for arrangement of equipment or the like, which is required in the manufacture-related process step, can be defined on an inner side of the recessed portion. Further, when the separation distance between the first guide roller and the second guide roller is set to be larger than the separation distance between the first contact portion and the second contact portion, a large installation space for equipment and the like required in the manufacture-related process step can be defined, and the installation operation and the maintenance operation can be efficiently performed.

In the method of the present invention, the manufacture-related process step comprises a cutting step of irradiating the glass film that is being conveyed with a laser beam, to thereby separate the glass film. In the method of the present invention, the glass film can be cut with high accuracy through the above-mentioned conveyance using the conveyance sheet material.

It is preferred that the cutting step comprises generating a thread-like peeled material in a helical shape from an end portion in a width direction of the glass film separated through irradiation with the laser beam, and the conveying step comprises covering at least a part of the conveyance sheet with a cover member so that the thread-like peeled material is prevented from being brought into contact with the conveyance sheet material in the non-contact portion. With this, the adhesion of the thread-like peeled material to the conveyance sheet material can be prevented.

Advantageous Effects of Invention

According to the present invention, a glass film can be conveyed so that a manufacture-related process can be suitably performed.

DESCRIPTION OF EMBODIMENTS

Now, embodiments of the present invention are described with reference to the drawings. In each of FIG. 1 to FIG. 4, a method of manufacturing a glass film and an apparatus for manufacturing a glass film according to a first embodiment of the present invention are illustrated.

Figure 1:
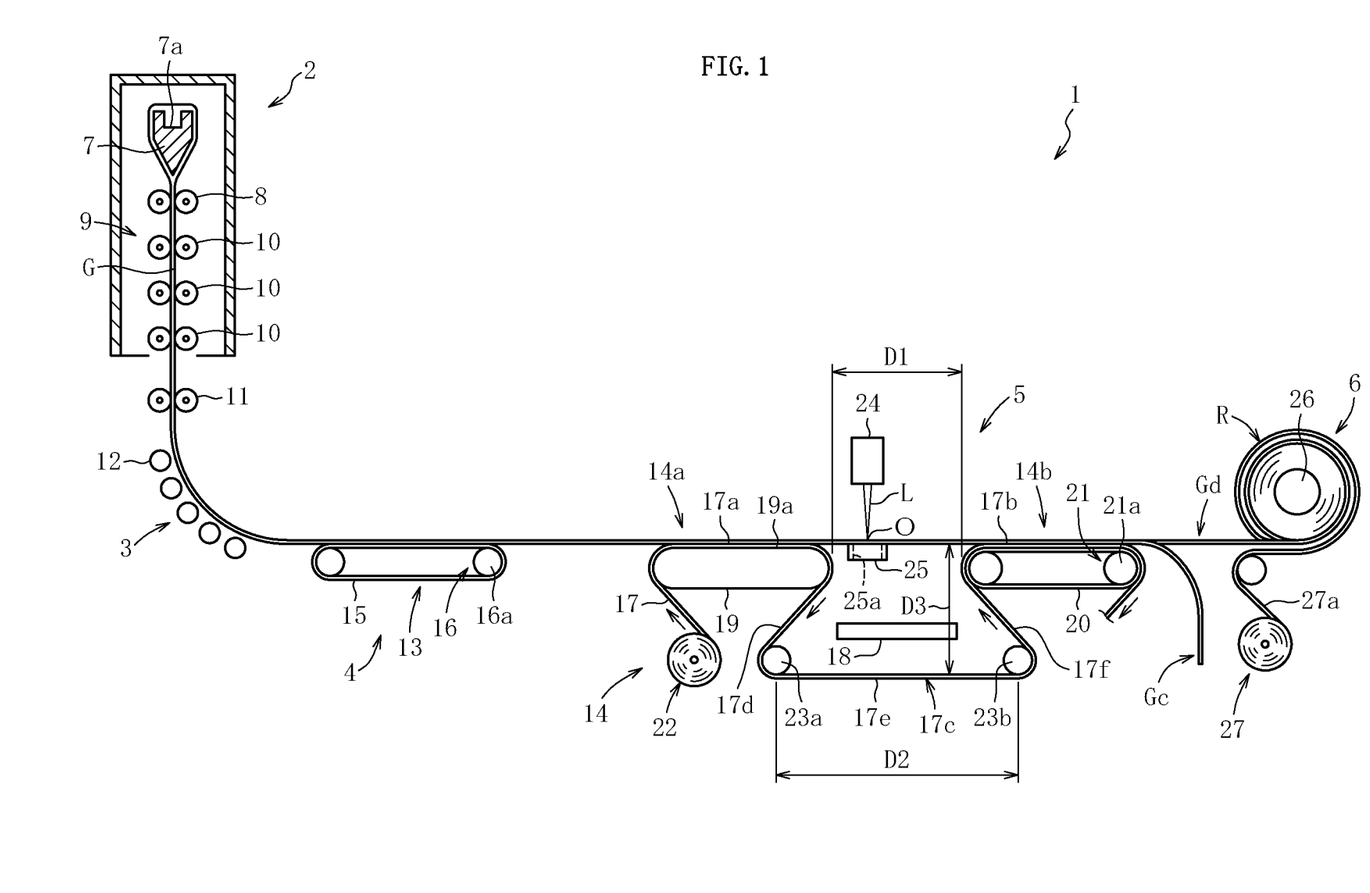
FIG. 1 is a side view for illustrating an apparatus for manufacturing a glass film according to a first embodiment.

FIG. 1 is a schematic side view for schematically illustrating an overall configuration of an apparatus for manufacturing a glass film. As illustrated in FIG. 1, a manufacturing apparatus 1 comprises: a forming portion 2 configured to form a glass film G; a direction conversion portion 3 configured to convert a traveling direction of the glass film G from a vertically downward direction to a lateral direction; a lateral conveying portion 4 configured to convey the glass film G in the lateral direction after the direction conversion; a cutting portion 5 configured to cut end portions Ga and Gb of the glass film G in a width direction as non-product portions Gc while the glass film G is conveyed in the lateral direction with the lateral conveying portion 4; and a take-up portion 6 configured to take up a product portion Gd into a roll shape to form a glass roll R, the product portion Gd being obtained by cutting and removing the non-product portions Gc with the cutting portion 5.

In the following description, the term "upstream" (side) refers to a position closer to a forming portion 2 or a glass roll starting material Ra described later, and the term "downstream" (side) refers to a position closer to a take-up portion 6. In this embodiment, the thickness of the product portion Gd is set to 300 µm or less, preferably 10 µm or more and 200 µm or less, more preferably 50 µm or more and 100 µm or less, but is not limited to this range.

The forming portion 2 comprises: a forming body 7 having a substantially wedge shape in sectional view in which an overflow groove 7a is formed on an upper end portion thereof; edge rollers 8 arranged immediately below the forming body 7 and configured to sandwich molten glass overflowing from the forming body 7 from both front and back surface sides of the molten glass; and an annealer 9 arranged immediately below the edge rollers 8.

The forming portion 2 is configured to cause the molten glass overflowing from an upper portion of the overflow groove 7a of the forming body 7 to flow down along both side surfaces of the forming body 7 to be joined at a lower end of the forming body 7, to thereby form a molten glass in a film shape. The edge rollers 8 are configured to control shrinkage of the molten glass in a width direction to form the glass film G having a predetermined width. The annealer 9 is configured to perform strain removal treatment on the glass film G. The annealer 9 comprises annealer rollers 10 arranged in a plurality of stages in a vertical direction.

Support rollers 11 configured to sandwich the glass film G from both the front and back surface sides are arranged below the annealer 9. A tension for encouraging thinning of the glass film G is applied between the support rollers 11 and the edge rollers 8 or between the support rollers 11 and the annealer rollers 10 at any one position.

The direction conversion portion 3 is arranged at a position below the support rollers 11. In the direction conversion portion 3, a plurality of guide rollers 12 configured to guide the glass film G are arranged in a curved form. Those guide rollers 12 are configured to guide the glass film G, which has been conveyed in the vertical direction, in the lateral direction.

The lateral conveying portion 4 is arranged on a forward side in a traveling direction with respect to (on a downstream side of) the direction conversion portion 3. The lateral conveying portion 4 comprises: a first conveying device 13 and a second conveying device 14. The first conveying device 13 is positioned on an upstream side, and the second conveying device 14 is positioned on a downstream side of the first conveying device 13.

The first conveying device 13 comprises: an endless belt-like conveyor belt 15; and a driver 16 for the conveyor belt 15. The first conveying device 13 is configured to continuously convey the glass film G having passed through the direction conversion portion 3 to a downstream side by bringing an upper surface of the conveyor belt 15 into contact with the glass film G. The driver 16 comprises: a driving body 16a for driving the conveyor belt 15, such as a roller or a sprocket; and a motor (not shown) configured to rotate the driving body 16a.

The second conveying device 14 comprises: a first conveying portion 14a; a second conveying portion 14b; a sheet material 17; and a cover member 18. The first conveying portion 14a is arranged on the upstream side. The second conveying portion 14b is arranged on the downstream side. The sheet material 17 is configured to convey the glass film G. The cover member 18 is configured to cover a part of the conveyance sheet material 17.

The first conveying portion 14a comprises a surface plate 19 configured to support a part of the conveyance sheet material 17. An upper surface 19a of the surface plate 19 is brought into contact with a lower surface of the conveyance sheet material 17. The conveyance sheet material 17 is configured to convey the glass film G by sliding on the upper surface 19a of the surface plate 19 to the downstream side under a state of being held in contact with the lower surface of the glass film G.

The second conveying portion 14b comprises: an endless belt-like conveyor belt 20; and a driver 21 for the conveyor belt 20. The second conveying portion 14b is configured to move the conveyance sheet material 17 to the downstream side by driving the conveyor belt 20 under a state of holding an upper surface of the conveyor belt 20 in contact with the lower surface of the conveyance sheet material 17. The driver 21 comprises: a driving body 21a for driving the conveyor belt 20, such as a roller or a sprocket; and a motor (not shown) configured to rotate the driving body 21a.

The first conveying portion 14a and the second conveying portion 14b are separated from each other at a predetermined distance in a conveying direction of the glass film G. The separation distance D1 is set to 10 mm or more and 1,000 mm or less, but is not limited to this range.

The conveyance sheet material 17 is pulled out from a sheet roll 22 provided at a position below the first conveying portion 14a on the upstream side and passes through the first conveying portion 14a and the second conveying portion 14b to be collected at a position below the second conveying portion 14b on the downstream side. A take-up device (not shown) configured to collect the conveyance sheet material 17 is arranged on the downstream side of the second conveying portion 14b.

Guide rollers 23a and 23b configured to guide the conveyance sheet material 17 are arranged at positions below the first conveying portion 14a and the second conveying portion 14b, respectively. The guide rollers 23a and 23b comprise: a first guide roller 23a arranged at a position closer to the first conveying portion 14a; and a second guide roller 23b arranged at a position closer to the second conveying portion 14b. A separation distance D2 between the first guide roller 23a and the second guide roller 23b is set to be larger than the separation distance D1 between the first conveying portion 14a and the second conveying portion 14b.

The conveyance sheet material 17 is formed of, for example, a foamed resin sheet, but is not limited to this material. The conveyance sheet material 17 is supported by the first conveying portion 14a, the second conveying portion 14b, and each of the guide rollers 23a and 23b under a state of being applied with certain tension. The conveyance sheet material 17 comprises: a first contact portion 17a that is brought into contact with the lower surface of the glass film G under a state of being supported by the first conveying portion 14a; a second contact portion 17b that is brought into contact with the lower surface of the glass film G under a state of being supported by the second conveying portion 14b; and a non-contact portion 17c that is prevented from being brought into contact with the glass film G between the first contact portion 17a and the second contact portion 17b.

The first contact portion 17a is brought into surface contact with the upper surface 19a of the surface plate 19 of the first conveying portion 14a, and is brought into surface contact with the lower surface of the glass film G. The second contact portion 17b is brought into surface contact with the upper surface of the conveyor belt 20 of the second conveying portion 14b, and is brought into surface contact with the lower surface of the glass film G.

The non-contact portion 17c is supported by each of the guide rollers 23a and 23b between the first conveying portion 14a and the second conveying portion 14b to be deformed so as to be recessed downward, to thereby form the recessed portion. Specifically, the non-contact portion 17c comprises: a first portion 17d configured to descend from an end portion of the first conveying portion 14a on the downstream side to the first guide roller 23a below the end portion of the first conveying portion 14a on the downstream side; a second portion 17e configured to move substantially in a horizontal direction from the first guide roller 23a to the second guide roller 23b; and a third portion 17f configured to ascend from the second guide roller 23b to an end portion of the second conveying portion 14b on the upstream side.

The first portion 17d is inclined so that an upper portion thereof is positioned on the downstream side of a lower portion thereof. The second portion 17e is supported by the first guide roller 23a and the second guide roller 23b so as to assume a substantially horizontal posture. The third portion 17f is inclined so that a lower portion thereof is positioned on the downstream side of an upper portion thereof.

With the above-mentioned configuration, a dimension of the non-contact portion 17c in the conveying direction of the glass film G is set to be larger than a separation distance between the first contact portion 17a and the second contact portion 17b (separation distance D1 between the first conveying portion 14a and the second conveying portion 14b). Specifically, a separation distance between the first portion 17d and the third portion 17f is larger than the separation distance D1 between the first contact portion 17a and the second contact portion 17b. A length of the second portion 17e is equal to the separation distance D2 between the first guide roller 23a and the second guide roller 23b. Thus, the length D2 of the second portion 17e is larger than the separation distance D1 between the first contact portion 17a and the second contact portion 17b. The length D2 of the second portion 17e is preferably 1.05 times to 2 times, more preferably 1.1 times to 1.5 times the separation distance D1 between the first contact portion 17a and the second contact portion 17b. A separation distance D3 in a vertical direction between the second portion 17e of the non-contact portion 17c and the glass film G is preferably 100 mm or more and 1,000 mm or less, more preferably 200 mm or more and 600 mm or less.

As described above, the non-contact portion 17c formed as the recessed portion has an upper surface separated from the lower surface of the glass film G, and has a space for arrangement of the cover member 18 on an inner side thereof.

The cover member 18 is formed of a rectangular plate-shaped member. The cover member 18 is arranged on the inner side of the non-contact portion 17c formed as the recessed portion so as to cover a part of the non-contact portion 17c of the conveyance sheet material 17. More specifically, the cover member 18 is arranged at a position above the second portion 17e of the non-contact portion 17c, and is configured to cover a part of the second portion 17e. In addition, the cover member 18 is arranged so as to be substantially parallel to a width direction W of the glass film G.

In each of end portions Ga and Gb of the glass film G in the width direction, a portion (hereinafter referred to as "edge portion") Ge having a thickness larger than that of a center portion is formed. It is preferred that a width WS of the conveyance sheet material 17 have a dimension smaller by 400 mm than a width WG of the glass film G as a lower limit.

Figure 2:
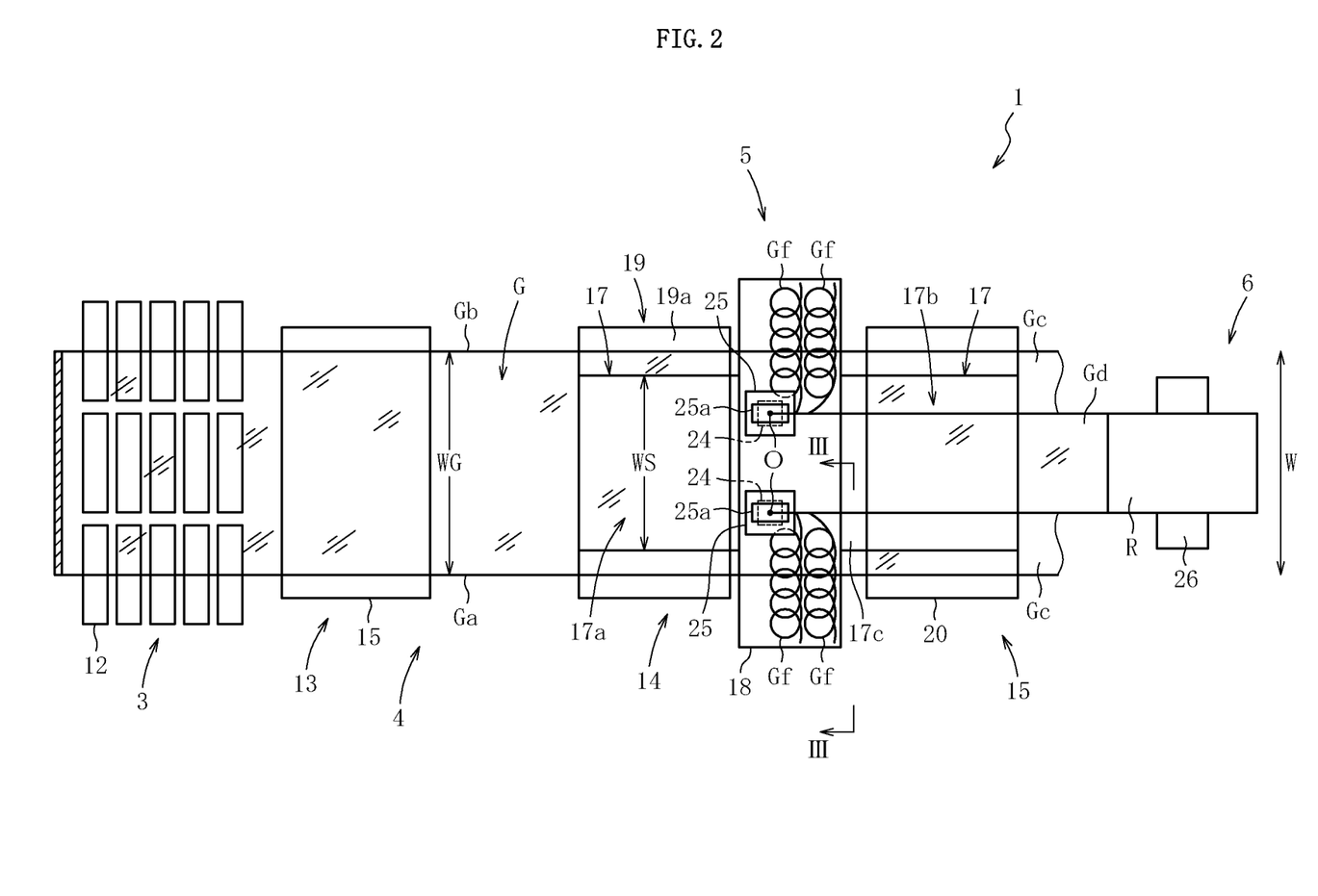
FIG. 2 is a plan view of the apparatus for manufacturing a glass film.

As illustrated in FIG. 1 and FIG. 2, a cutting portion 5 is arranged so as to correspond to a halfway portion of the second conveying device 14 in the lateral conveying portion 4. The cutting portion 5 comprises: laser irradiation apparatuses 24; and surface plates 25 configured to support the glass film G.

The laser irradiation apparatus 24 is arranged above the surface plate 25. The laser irradiation apparatus 24 is configured to radiate a laser beam L, such as a $CO_2$ laser, a YAG laser, or any other laser, downward. In this embodiment, two laser irradiation apparatuses 24 are arranged so as to cut both the end portions Ga and Gb of the glass film G in the width direction (see FIG. 2).

The surface plate 25 has an opening 25a penetrating therethrough in the vertical direction. An irradiation position O of the laser beam L in the laser irradiation apparatus 24 is set within a range of the opening 25a. The opening 25a is connected to a vacuum pump (not shown). The cutting portion 5 is configured to perform cutting while sucking the glass film G from the opening 25a with the vacuum pump.

The take-up portion 6 is arranged on a downstream side of the second conveying device 14. The take-up portion 6 comprises: a take-up roller 26; a motor (not shown) configured to rotationally drive the take-up roller 26; and a protective sheet supply portion 27 configured to supply a protective sheet 27a to the take-up roller 26. The take-up portion 6 is configured to take up the product portion Gd into a roll shape by rotating the take-up roller 26 with the motor while causing the protective sheet 27a fed from the protective sheet supply portion 27 to overlap the product portion Gd. The product portion Gd having been taken up forms the glass roll R.

A method of manufacturing the glass roll R with the manufacturing apparatus 1 having the above-mentioned configuration is described below. The method of manufacturing the glass roll R comprises: a forming step of forming the band-like glass film G with the forming portion 2; a conveying step of conveying the glass film G with the direction conversion portion 3 and the lateral conveying portion 4; a cutting step of cutting the end portions Ga and Gb of the glass film G in the width direction with the cutting portion 5; and a take-up step of taking up the product portion Gd with the take-up portion 6 after the cutting step.

In the forming step, molten glass overflowing from an upper portion of the overflow groove 7a of the forming body 7 in the forming portion 2 is caused to flow down along both side surfaces of the forming body 7 to be joined at a lower end of the forming body 7, to thereby form a molten glass in a film shape. At this time, the shrinkage of the molten glass in a width direction is controlled with the edge rollers 8, and thus the glass film G having a predetermined width is formed. After that, strain removal treatment is performed on the glass film G with the annealer 9 (annealing step). The glass film G having a predetermined thickness is formed through a tension applied by the support rollers 11.

In the conveying step, the conveying direction of the glass film G is converted to a lateral direction with the direction conversion portion 3, and the glass film G is conveyed to the take-up portion 6 on a downstream side with the conveying devices 13 and 14. The second conveying device 14 is configured to move the second contact portion 17b of the conveyance sheet material 17 to the downstream side by driving the conveyor belt 20 of the second conveying portion 14b. In conjunction with (simultaneously with) this operation, the first contact portion 17a and the non-contact portion 17c of the conveyance sheet material 17 move to the downstream side. With this, the glass film G having been fed to the downstream side from the first conveying device 13 is continuously conveyed to the downstream side by the second conveying device 14.

Figure 3:
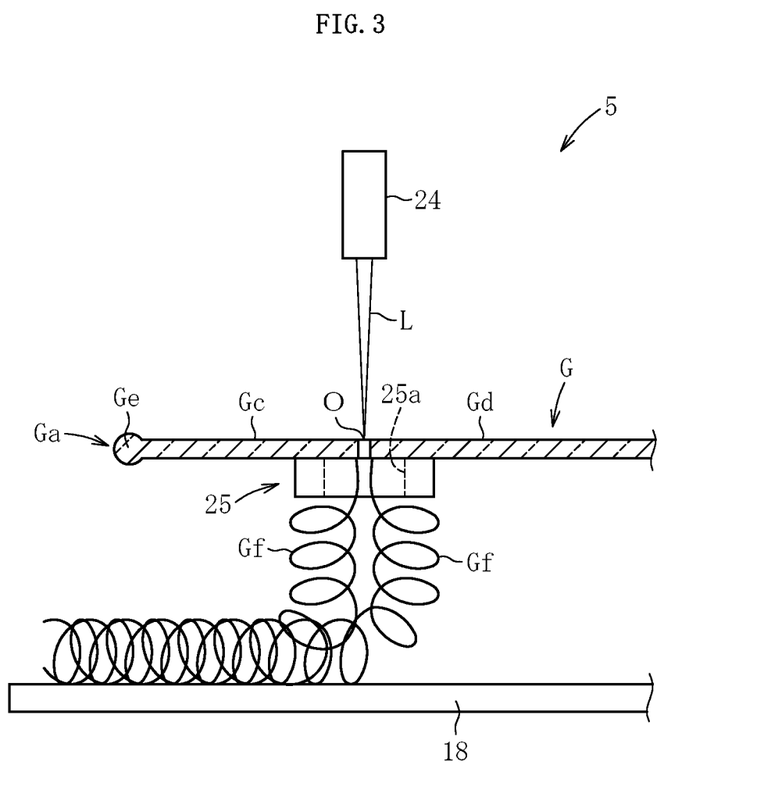
FIG. 3 is a sectional view taken along the line III-III of FIG. 2.

The cutting step is one example of a manufacture-related process step in the present invention. In the cutting step, as illustrated in FIG. 3, the glass film G is irradiated with the laser beam L from the laser irradiation apparatus 24 of the cutting portion 5, and both the end portions Ga and Gb of the glass film G in the width direction are cut. With this, the glass film G is separated into the non-product portions Gc and the product portion Gd.

Figure 4A:
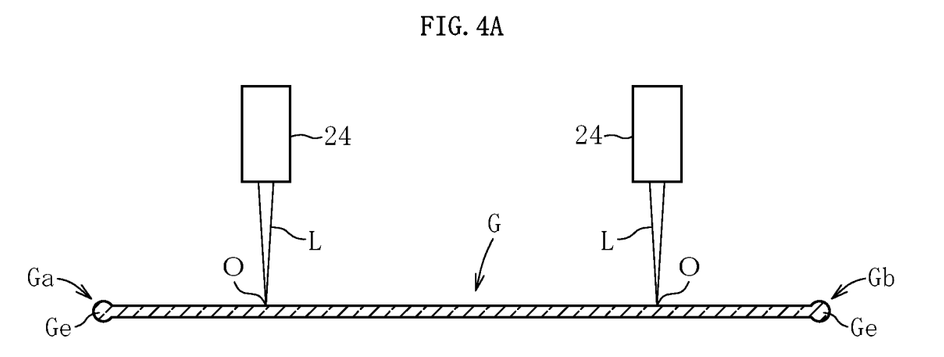
FIG. 4A is a sectional view of a glass film for illustrating a cutting step.
Figure 4B:
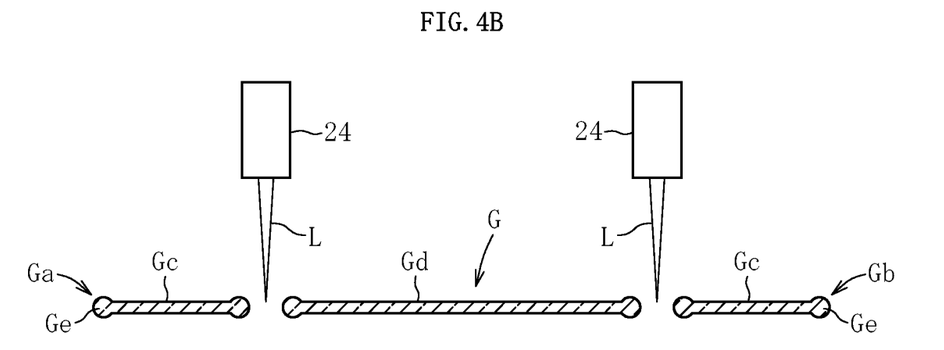
FIG. 4B is a sectional view of the glass film for illustrating the cutting step.

When the glass film G is irradiated with the laser beam L (see FIG. 4A), part of the glass film G is melt-cut by being heated with the laser beam L (see FIG. 4B). The glass film G is conveyed with the second conveying device 14, and hence the melt-cut portion is moved away from the laser beam L.

With this, the melt-cut portion of the glass film G is cooled. Through the cooling, a heat strain occurs in the melt-cut portion, and a stress resulting therefrom acts as a tensile force in a portion not having been melt-cut. By the action, the thread-like peeled material Gf is separated from each of an end portion of the non-product portion Gc in a width direction and an end portion of the product portion Gd in a width direction (see FIG. 4C).

Figure 4C:
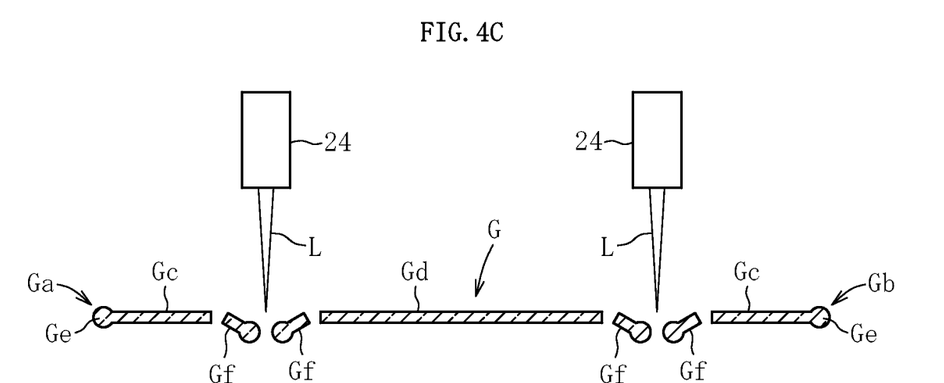
FIG. 4C is a sectional view of the glass film for illustrating the cutting step.

The separated thread-like peeled material Gf moves downward by its own weight. The thread-like peeled material Gf is deformed into a helical shape after being separated from the non-product portion Gc or the product portion Gd. In the cutting step, the thread-like peeled material Gf generated from the non-product portion Gc and the product portion Gd is received by the cover member 18. The thread-like peeled material Gf mounted on the cover member 18 is collected and discarded (collecting step).

The non-product portions Gc are conveyed to a downstream side with the second conveying device 14, and collected on an upstream side of the take-up portion 6 with another collecting device not shown in the figures.

In the take-up step, the product portion Gd conveyed with the second conveying device 14 is taken up into a roll shape with the take-up roller 26 of the take-up portion 6 while the protective sheet 27a is supplied to the product portion Gd from the protective sheet supply portion 27. When the product portion Gd having a predetermined length is taken up with the take-up roller 26, the glass roll R is completed.

In the method of manufacturing the glass film G according to this embodiment described above, through use of the same conveyance sheet material 17 in conveyance of the glass film G by the first conveying portion 14a positioned on the upstream side of the cutting portion 5 and the second conveying portion 14b positioned on the downstream side of the cutting portion 5, the conveyance of the glass film G can be synchronized between the upstream side and the downstream side of the cutting portion 5. With this, unexpected tension does not occur on the glass film G at a position corresponding to the cutting portion 5, and positional displacement of the glass film G does not occur, either. Thus, the thread-like peeled material Gf can be continuously generated without being broken from the end portion of the product portion Gd in the width direction. With this, an end surface of the product portion Gd can be uniformly configured, and the quality as a product can be improved.

In addition, the non-contact portion 17c of the conveyance sheet material 17 is supported by the first guide roller 23a and the second guide roller 23b to be deformed into a recessed shape between the first contact portion 17a (first conveying portion 14a) and the second contact portion 17b (second conveying portion 14b). Thus, when the non-contact portion 17c is formed as the recessed portion under a state of being separated from the glass film G, a space for installation of the cover member 18 can be defined on the inner side of the recessed portion. The thread-like peeled material Gf is mounted on the cover member 18, and thus the thread-like peeled material Gf can be collected without being brought into contact with the conveyance sheet material 17.

In addition, when the separation distance D2 between the first guide roller 23a and the second guide roller 23b is set to be larger than the separation distance D1 between the first contact portion 17a (first conveying portion 14a) and the second contact portion 17b (second conveying portion 14b), the space on the inner side of the non-contact portion 17c formed as the recessed portion can be enlarged to the extent possible. With this, a large installation space for the cover member 18 can be defined. Therefore, the installation operation of the cover member 18 and the maintenance operation, and eventually, the collecting operation of the thread-like peeled material Gf can be efficiently performed.

Figure 5:
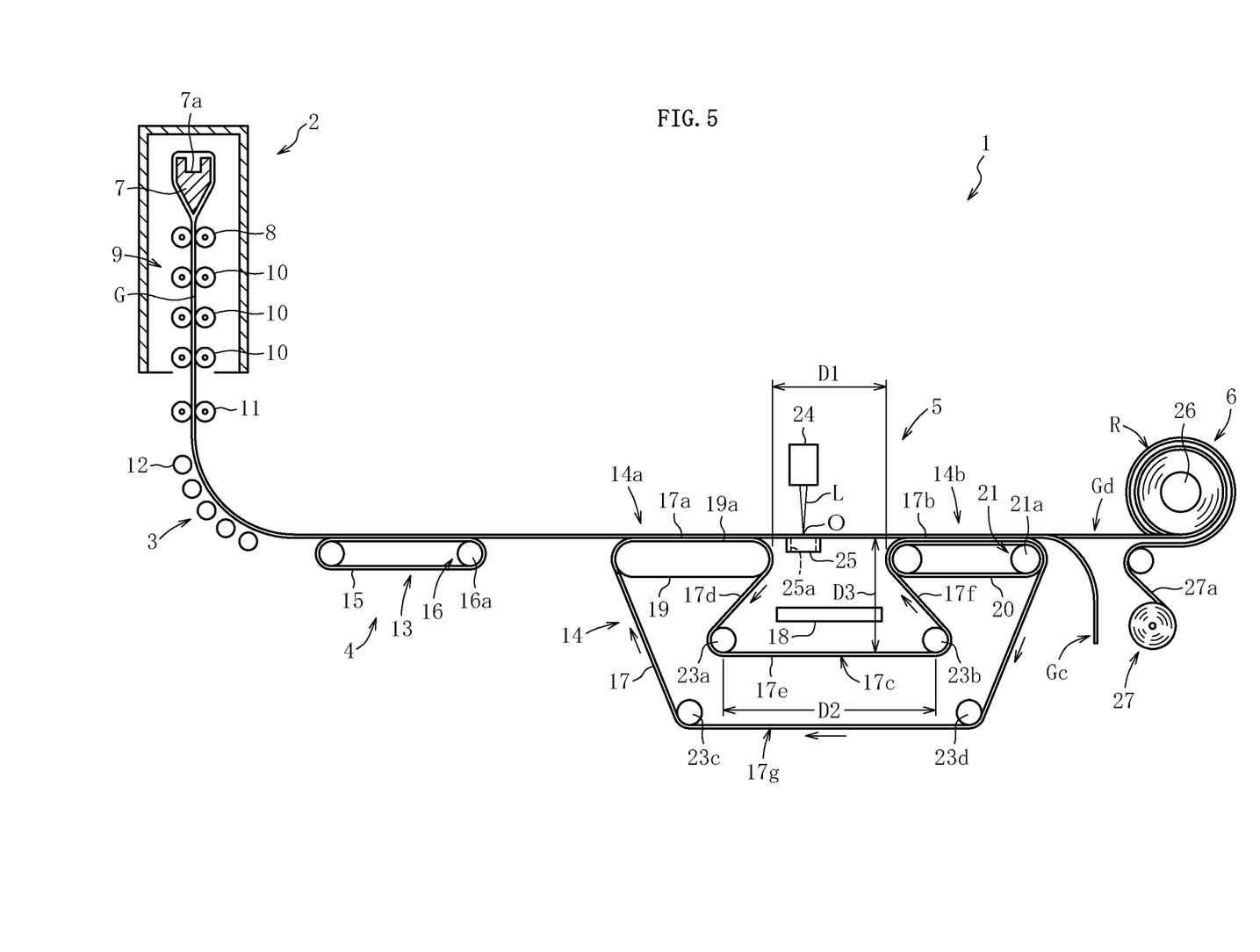
FIG. 5 is a side view for illustrating an apparatus for manufacturing a glass film according to a second embodiment.

FIG. 5 is a view for illustrating a method of manufacturing a glass film and an apparatus for manufacturing a glass film according to a second embodiment. In this embodiment, the configuration of the second conveying device 14 of the lateral conveying portion 4 is different from that of the first embodiment.

In this embodiment, the second conveying device 14 is configured to circulate and forward the conveyance sheet material 17 between the first conveying portion 14a and the second conveying portion 14b. The second conveying device 14 comprises a third guide roller 23c and a fourth guide roller 23d at positions below the first conveying portion 14a and the second conveying portion 14b, respectively, in addition to the first guide roller 23a and the second guide roller 23b. The third guide roller 23c is configured to guide the conveyance sheet material 17 having passed through the second conveying portion 14b to the upstream side. The fourth guide roller 23d is configured to guide the conveyance sheet material 17 guided by the third guide roller 23c to the first conveying portion 14a.

The conveyance sheet material 17 is formed into an annular shape or a loop shape, and is supported by the first conveying portion 14a, the second conveying portion 14b, and each of the guide rollers 23a to 23d. The conveyance sheet material 17 comprises a return portion 17g configured to move from the second conveying portion 14b to the first conveying portion 14a, in addition to the first contact portion 17a, the second contact portion 17b, and the non-contact portion 17c. The return portion 17g is a portion configured to connect an end portion of the first contact portion 17a on the upstream side to an end portion of the second contact portion 17b on the downstream side, and is not held in contact with the glass film G. The conveyance sheet material 17 is configured to convey the glass film G to the take-up portion 6 by being driven with the conveyor belt 20 of the second conveying portion 14b to simultaneously move the first contact portion 17a, the second contact portion 17b, the non-contact portion 17c, and the return portion 17g.

Figure 6:
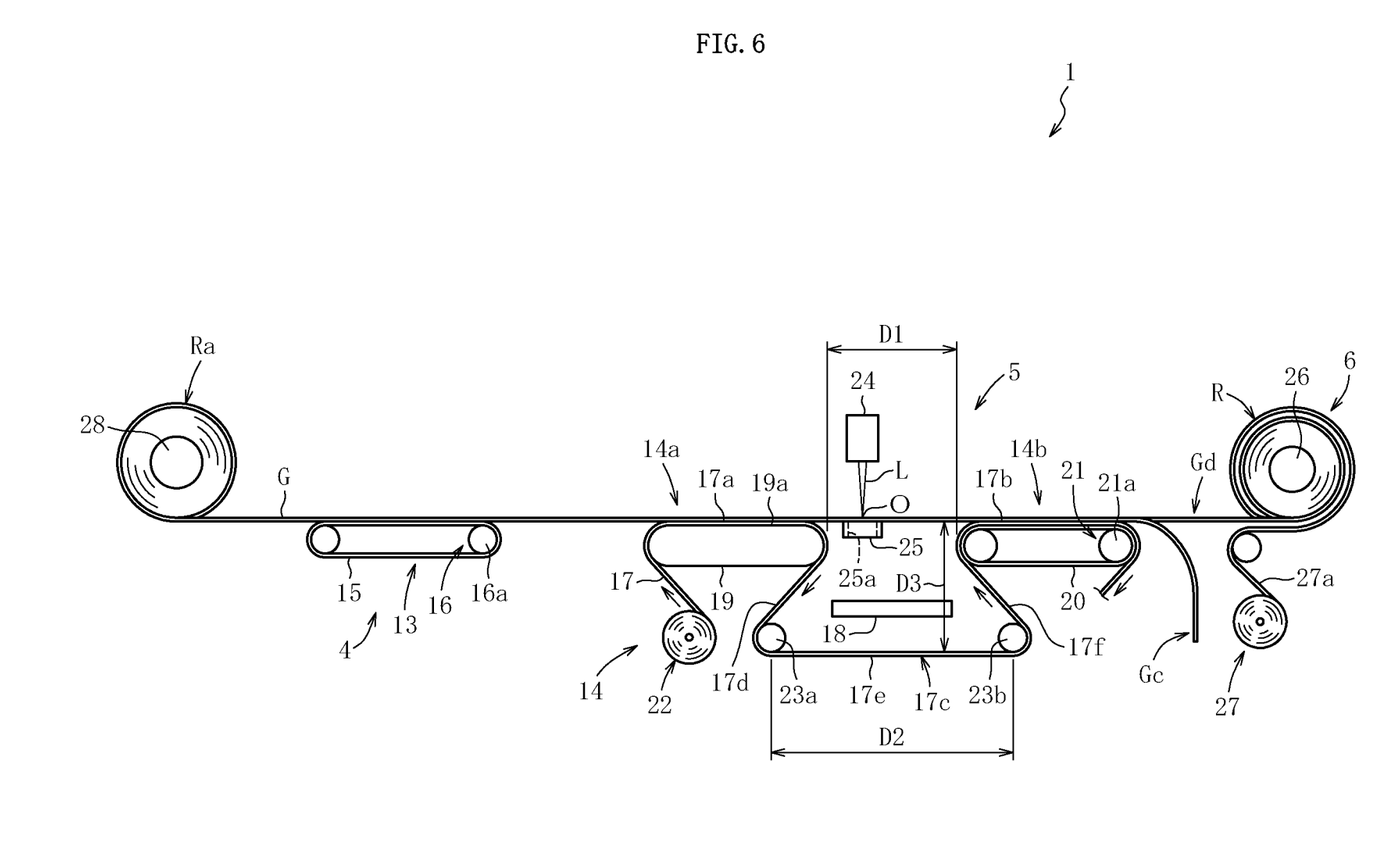
FIG. 6 is a side view for illustrating an apparatus for manufacturing a glass film according to a third embodiment.

In FIG. 6, a method of manufacturing a glass film and an apparatus for manufacturing a glass film according to a third embodiment of the present invention are illustrated. While an example in which the glass film G is manufactured by an overflow down-draw method has been described in the first embodiment and the second embodiment, an example in which a glass film G (glass roll R) is manufactured by a roll-to-roll process is described in this embodiment.

As illustrated in FIG. 6, a manufacturing apparatus 1 comprises, on the most upstream side, a glass roll starting material Ra in which a glass film G to be processed is formed into a roll shape instead of the forming portion 2 and the direction conversion portion 3 in the first embodiment. The glass roll starting material Ra is taken up by a supply roller 28. A lateral conveying portion 4, a cutting portion 5, and a take-up portion 6 are arranged in the stated order on a downstream side of the glass roll starting material Ra as in the first embodiment. Those elements 4 to 6 have the same configurations as in the first embodiment.

A method of manufacturing the glass film G (glass roll R) in this embodiment comprises: a glass film supply step of drawing the glass film G to be processed from the glass roll starting material Ra and supplying the glass film G to a downstream side; a conveying step; a cutting step; and a take-up step. In the glass film supply step, the manufacturing apparatus 1 is configured to draw the glass film G to be processed from the glass roll starting material Ra and move the glass film G to be processed to a downstream side by rotating the supply roller 28. The subsequent conveying step, cutting step, and take-up step are the same as in the first embodiment.

In this embodiment, the glass film G to be processed may be separated into a plurality of glass films G in the cutting step, and part or all of the glass films G may each be used as a product. In this case, a plurality of take-up rollers 26 are arranged in the take-up portion 6 depending on the number of products to be manufactured.

Figure 7:
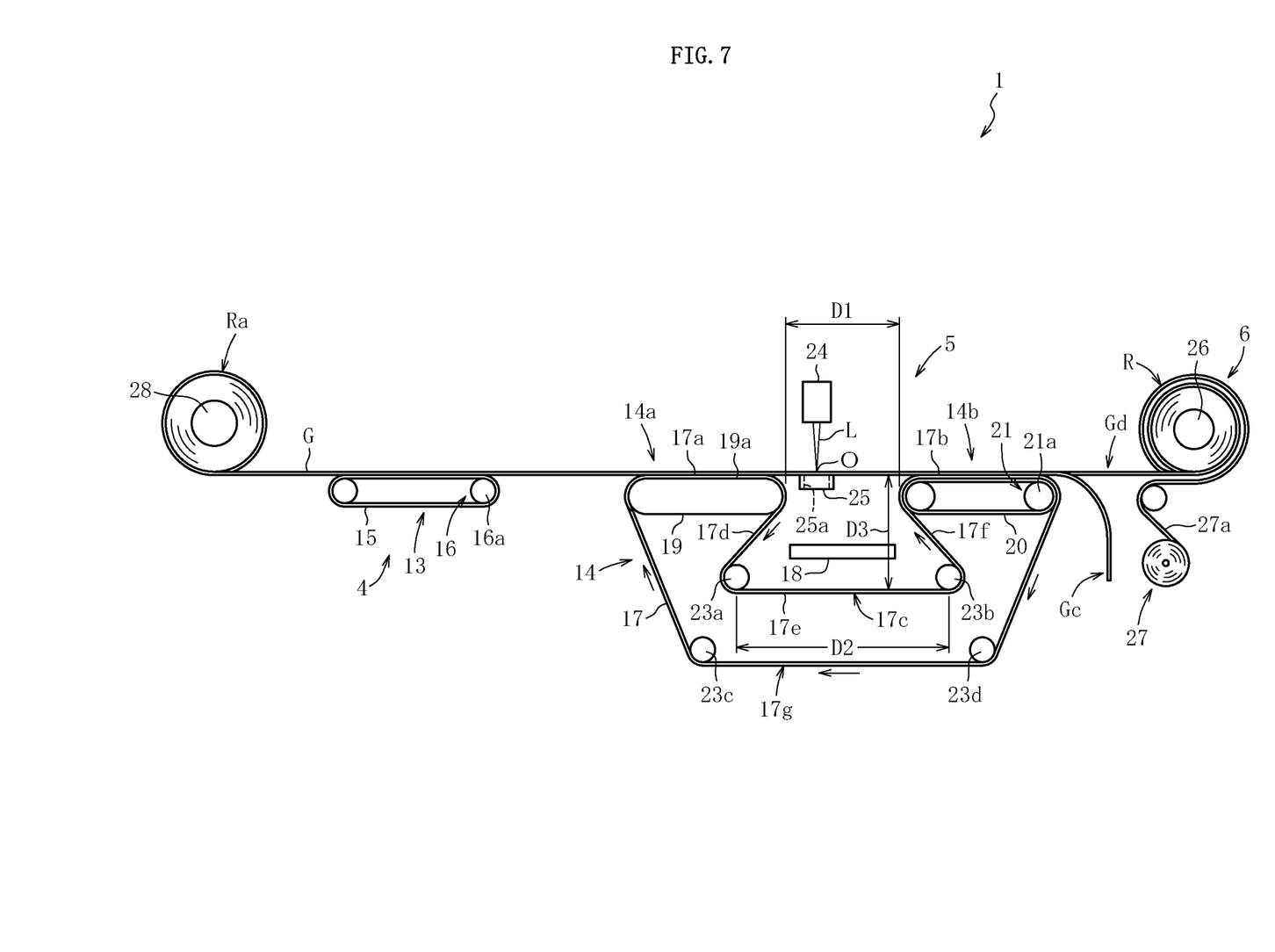
FIG. 7 is a side view for illustrating an apparatus for manufacturing a glass film according to a fourth embodiment.

In FIG. 7, a method of manufacturing a glass film and an apparatus for manufacturing a glass film according to a fourth embodiment of the present invention are illustrated. A manufacturing apparatus 1 according to this embodiment comprises, on the most upstream side, a glass roll starting material Ra in which a glass film G to be processed is formed into a roll shape instead of the forming portion 2 and the direction conversion portion 3 in the second embodiment. The glass roll starting material Ra is taken up by a supply roller 28. A lateral conveying portion 4, a cutting portion 5, and a take-up portion 6 are arranged in the stated order on a downstream side of the glass roll starting material Ra as in the second embodiment. Those elements 4 to 6 have the same configurations as in the second embodiment.

Figure 8:
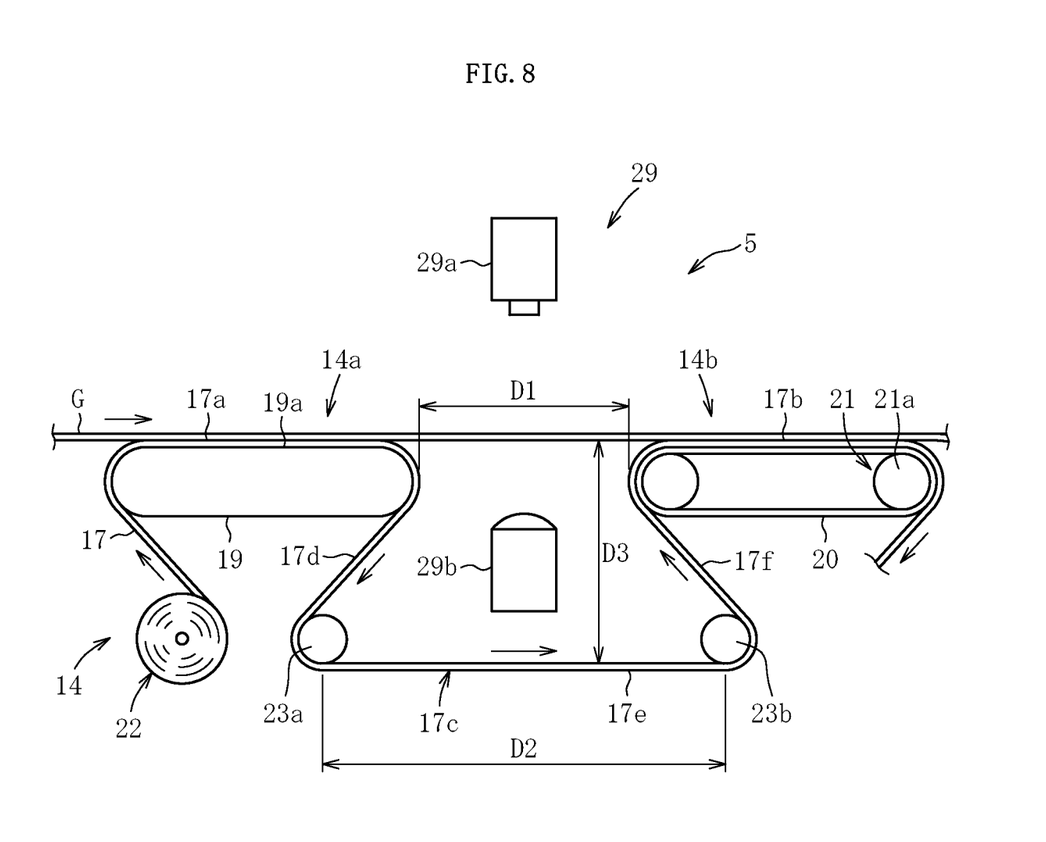
FIG. 8 is a side view for illustrating an apparatus for manufacturing a glass film according to a fifth embodiment.

FIG. 8 is a view for illustrating a method of manufacturing a glass film and an apparatus for manufacturing a glass film according to a fifth embodiment. In this embodiment, the manufacturing apparatus 1 comprises an inspection portion 29 arranged in place of the cutting portion 5. The other configuration is the same as that of the first embodiment.

The inspection portion 29 is arranged between the first conveying portion 14a and the second conveying portion 14b, that is, at a position corresponding to the non-contact portion 17c of the conveyance sheet material 17. The inspection portion 29 comprises: an image pickup device 29a arranged above the glass film G; and an illumination device 29b arranged below the glass film G. The image pickup device 29a and the illumination device 29b are arranged so as to be opposed to each other in the vertical direction. The inspection portion 29 is configured to image the glass film G with the image pickup device 29a while transmitting light from the illumination device 29b through the glass film G from below (inspection step).

The present invention is not limited to the configurations of the above-mentioned embodiments. In addition, the action and effect of the present invention are not limited to those described above. The present invention may be modified in various forms within the range not departing from the spirit of the present invention.

In the above-mentioned embodiments, as an example of the manufacture-related process step, the cutting step of the glass film G through use of peeling, the collecting step of the thread-like peeled material Gf, and the inspection step of the glass film G are exemplified, but the present invention is not limited thereto. The manufacture-related process step comprises various other steps such as a cutting step of the glass film G through use of laser cleaving.

In the above-mentioned embodiments, the cover member 18 formed into a plate shape is exemplified, but the present invention is not limited thereto. The cover member 18 may be formed of, for example, a conveyor capable of conveying the thread-like peeled material Gf.

In the above-mentioned embodiments, there is exemplified the case in which the non-contact portion 17c of the conveyance sheet material 17 is formed into a recessed shape with the two guide rollers 23a and 23b, but the present invention is not limited thereto. The non-contact portion 17c may be formed into a recessed shape with three or more guide rollers. In this case, it is desired that a minimum separation distance between the guide roller positioned on the upstream side and the guide roller positioned on the downstream side be set to be larger than the separation distance D1 between the first contact portion 17a and the second contact portion 17b.

In addition, in the above-mentioned embodiments, there is exemplified the case in which the second portion 17e of the non-contact portion 17c is configured to move horizontally, but the present invention is not limited thereto. The second portion 17e may be inclined with respect to the horizontal direction.

REFERENCE SIGNS LIST 14 conveying device (second conveying device)
17 conveyance sheet material
17a first contact portion
17b second contact portion
17c non-contact portion
18 cover member
G glass film
Gf thread-like peeled material
L laser beam

The invention claimed is:

1. A method of manufacturing a glass film, the method comprising:
   a conveying step of conveying an elongated glass film from upstream to downstream in a conveying direction along a longitudinal direction thereof; and
   a manufacture-related process step of subjecting the glass film to a predetermined process,
   wherein the conveying step comprises moving a conveyance sheet material that is brought into contact with a lower surface of the glass film, to thereby convey the glass film, wherein the conveyance sheet material comprises:
- a first contact portion that is brought into contact with the lower surface of the glass film on the upstream side in the manufacture-related process step;
- a second contact portion that is brought into contact with the lower surface of the glass film on the downstream side in the manufacture-related process step; and
- a non-contact portion that is disposed below and away from the glass film, formed between the first contact portion and the second contract portion, and is prevented from being brought into contact with the lower surface of the glass film, wherein the first contact portion is integrally connected to the non-contact portion, and the non-contact portion is integrally connected to the second contact portion, and wherein the manufacture-related process step comprises subjecting the glass film to the predetermined process above the non-contact portion while simultaneously moving the first contact portion, the second contact portion, and the non-contact portion of the conveyance sheet material through the conveying step.

2. The method of manufacturing a glass film according to claim 1, wherein the conveying step comprises moving the second contact portion to the downstream side by a conveying device, to thereby simultaneously move the first contact portion and the non-contact portion.

3. A method of manufacturing a glass film, the method comprising:
- a conveying step of conveying an elongated glass film from upstream to downstream in a conveying direction along a longitudinal direction thereof; and
- a manufacture-related process step of subjecting the glass film to a predetermined process,
- wherein the conveying step comprises moving a conveyance sheet material that is brought into contact with a lower surface of the glass film, to thereby convey the glass film,
- wherein the conveyance sheet material comprises:
  - a first contact portion that is brought into contact with the lower surface of the glass film on the upstream side in the manufacture-related process step;
  - a second contact portion that is brought into contact with the lower surface of the glass film on the downstream side in the manufacture-related process step; and
  - a non-contact portion that is disposed below and away from the glass film, is formed between the first contact portion and the second contract portion, and is prevented from being brought into contact with the lower surface of the glass film,
- wherein the non-contact portion is supported by a first guide roller arranged on the upstream side and a second guide roller arranged on the downstream side so that the non-contact portion is deformed downward into a recessed shape at a position below the first contact portion and the second contact portion, and
- wherein a separation distance between the first guide roller and the second guide roller in the conveying direction is set to be larger than a separation distance between the first contact portion and the second contact portion, and
- wherein the manufacture-related process step comprises subjecting the glass film to the predetermined process above the non-contact portion while simultaneously moving the first contact portion, the second contact portion, and the non-contact portion of the conveyance sheet material through the conveying step.

4. The method of manufacturing a glass film according to claim 1, wherein the manufacture-related process step comprises a cutting step of irradiating the glass film that is being conveyed with a laser beam, to thereby separate the glass film.

5. The method of manufacturing a glass film according to claim 4,
- wherein the cutting step comprises generating a thread-like peeled material in a helical shape from an end portion in a width direction of the glass film separated through irradiation with the laser beam, and
- wherein the conveying step comprises covering at least a part of the conveyance sheet with a cover member so that the thread-like peeled material is prevented from being brought into contact with the non-contact portion of the conveyance sheet material.

6. The method of manufacturing a glass film according to claim 2,
- wherein the non-contact portion is supported by a first guide roller arranged on the upstream side and a second guide roller arranged on the downstream side so that the non-contact portion is deformed downward into a recessed shape at a position below the first contact portion and the second contact portion, and
- wherein a separation distance between the first guide roller and the second guide roller in the conveying direction is set to be larger than a separation distance between the first contact portion and the second contact portion.

7. The method of manufacturing a glass film according to claim 2, wherein the manufacture-related process step comprises a cutting step of irradiating the glass film that is being conveyed with a laser beam, to thereby separate the glass film.

8. The method of manufacturing a glass film according to claim 3, wherein the manufacture-related process step comprises a cutting step of irradiating the glass film that is being conveyed with a laser beam, to thereby separate the glass film.

9. The method of manufacturing a glass film according to claim 6, wherein the manufacture-related process step comprises a cutting step of irradiating the glass film that is being conveyed with a laser beam, to thereby separate the glass film.

10. The method of manufacturing a glass film according to claim 7,
- wherein the non-contact portion is supported by a first guide roller arranged on the upstream side and a second guide roller arranged on the downstream side so that the non-contact portion is deformed downward into a recessed shape at a position below the first contact portion and the second contact portion, and
- wherein a separation distance between the first guide roller and the second guide roller in the conveying direction is set to be larger than a separation distance between the first contact portion and the second contact portion.

11. The method of manufacturing a glass film according to claim 9,
- wherein the non-contact portion is supported by a first guide roller arranged on the upstream side and a second guide roller arranged on the downstream side so that the non-contact portion is deformed downward into a recessed shape at a position below the first contact portion and the second contact portion, and wherein a separation distance between the first guide roller and the second guide roller in the conveying direction is set to be larger than a separation distance between the first contact portion and the second contact portion.

* * * * *